Nov. 6, 1962  G. E. FRANCK  3,062,240
CONNECTOR
Filed March 27, 1958
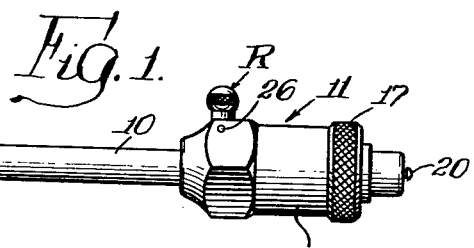
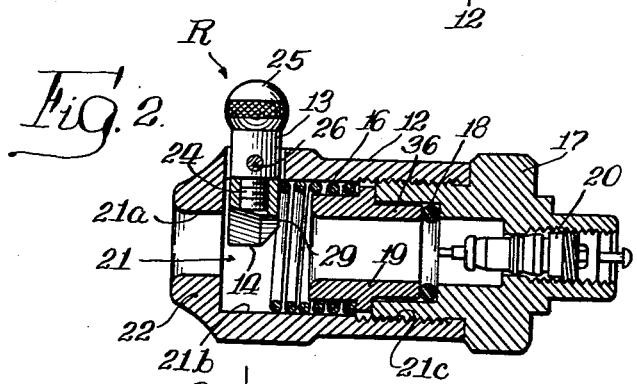
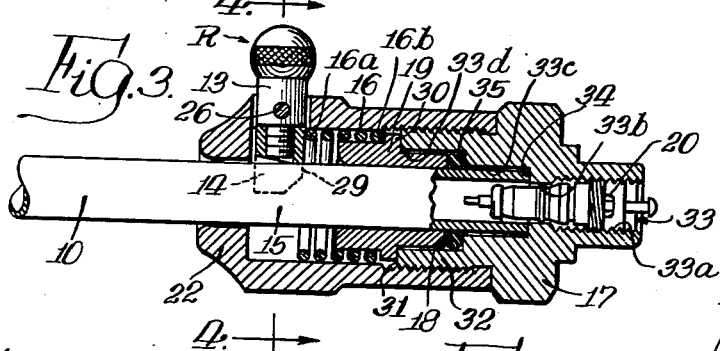
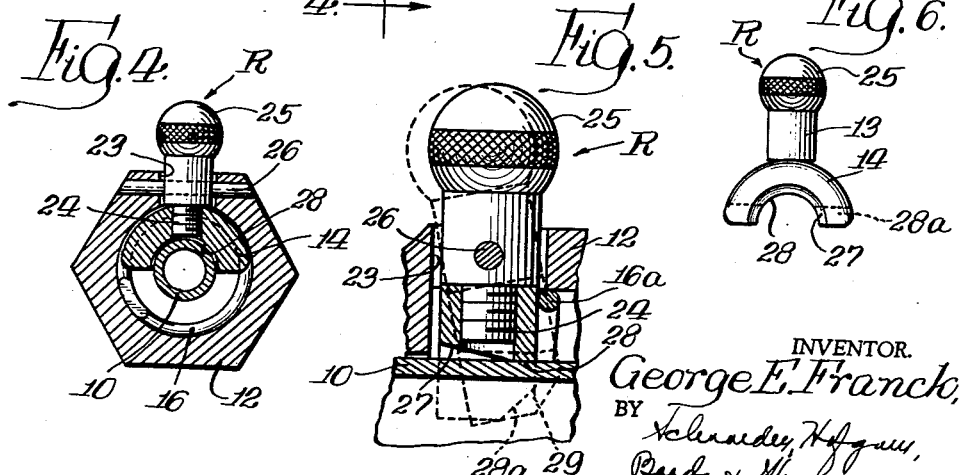
INVENTOR.
George E. Franck

United States Patent Office 3,062,240
Patented Nov. 6, 1962

3,062,240
CONNECTOR
George E. Franck, Riverside, Ill., assignor to Imperial-
Eastman Corporation, a corporation of Illinois
Filed Mar. 27, 1958, Ser. No. 724,374
3 Claims. (Cl. 138—89)

This invention relates to tube fittings and in particular to a quick-connect type tube connector.

It is desirable, at times, to provide a fitting on the straight end of a tube which controlledly closes the tube end to allow fluid flow therethrough to and from the interior of the tube end as desired. It is desirable to arrange such a fitting to permit ready installation and removal from the tube end. Such a quick-connect fitting, for example, could be used in testing a tubing installation by installing the fitting on the end of the tube and connecting a suitable pressure or vacuum line thereto to apply a suitable test pressure to the interior of the tubing. Upon completion of the test, the fitting could be quickly removed from the tube end and a completion of the tubing installation effected.

The principal object of this invention is to provide a new and improved quick connection fitting for installation on a tube end.

Another object is to provide such a tube fitting having new and improved means for retaining the tube end in sealed association with the fitting body.

A further object is to provide such a fitting having new and improved means for effecting a seal between the tube end and the fitting body.

Still another object is to provide such a fitting having an associated valve means for controlling fluid flow or pressure transmission through the fitting to or from the interior of the tube end.

Other features and advantages of this invention will be apparent from the following description taken in connection with the accompanying drawings, wherein:

FIG. 1 is a side elevation of a fitting embodying the invention, installed on a portion of a tube end;

FIG. 2 is a diametric section of the fitting;

FIG. 3 is a diametric section of the fitting installed on a portion of a tube end, a portion of the tube end being broken away;

FIG. 4 is a transverse section taken approximately along the line 4—4 of FIG. 3;

FIG. 5 is a fragmentary, enlarged longitudinal section thereof showing the tube retaining means in an alternative position in dotted lines; and FIG. 6 is an elevation of the retaining means looking to the right as seen in FIG. 2.

In the exemplary embodiment of the invention as disclosed in the drawing, a tube fitting arranged for quick connection to a tube end 10 is shown to comprise a connector, generally designated 11, having a body 12 into which the tube end is inserted. To facilitate an understanding of the fitting structure, directions radially of the longitudinal axis of body 12 are hereinafter referred to as radially inwardly and radially outwardly, and directions longitudinally of said axis are hereinafter referred to as longitudinally inwardly (toward the right-hand end of body 12 as seen in FIG. 1) and longitudinally outwardly (toward the left-hand end of body 12 as seen in FIG. 1). A readily operable retaining means R is provided in body 12 comprising a lever 13 extending through the body and a pawl 14 on the radially inner end thereof arranged to be movable relative to the side wall 15 of the tube end. The pawl 14 is biased into a radially inner wedging position in which it engages the radially outer side wall surface of the tube end by a diasing spring 16 disposed within body 12. Lever 13 is arranged so that it may be readily manipulated to overcome the spring 16 and move pawl 14 to a radially outer released position wherein it is spaced somewhat from the tube side wall surface allowing the tube end and connector to have ready relative axial movement.

New and improved means are provided to seal the tube end to body 12 and to provide a second retaining means for holding the tube end against undesired withdrawal from the body. For this purpose, an annular flange member 17 is sealingly secured to body 12 to provide a longitudinally inner abutment for an annular seal 18 which is urged by spring 16, acting through a tubular sleeve 19, into sealing engagement with side wall 15 of the tube end and with member 17. Seal 18 and sleeve 19 are arranged internally to permit free movement of tube end 10 therethrough during installation or removal of the fitting relative to the tube end. A valve 20 may be associated with member 17 for controlling fluid flow therethrough.

To effect the connection of tube end 10 to the connector 11, all that need to be done is to effect a relative movement of the tube end into body 12; seal 18 automatically effects a proper seal between the tube end and the connector, and pawl 14 acts through lever 13 to lock the tube end in fixed association with the connector. Suitable fluid pressure may then be introduced into the interior of the tube end through member 17, valve 20 permitting this introduction of pressure and maintaining it within the tube end as desired.

More specifically, body 12 comprises a tubular member formed of a rigid material, such as metal, and provided with a bore 21 having a cylindrical longitudinally outer end portion 21a defined by a radially inwardly extending flange 22. The diameter of bore portion 21a is preferably only slightly larger than the outer diameter of tube end 10 to center the tube automatically during installation and to preclude inadvertent introduction of foreign material into the bore when the connector is installed. Longitudinally inwardly of outer portion 21a, bore 21 is provided with an enlarged diameter, cylindrical mid-portion 21b and a longitudinally inner threaded end portion 21c. Adjacent flange 22, the body is provided with an opening 23 extending transversely therethrough (radially of the bore axis) to open into the mid-portion 21b of the bore. Lever 13 of retaining means R extends through opening 23 to have a radially inner end 24 disposed within bore 21 and a radially outer end 25 extend outwardly from the body. The lever is mounted on body 12 to pivot about an axis perpendicular to a radius of the bore by means of a pivot pin 26 secured to body 12 and extending transversely across opening 23. Outer end 25 of the lever comprises a knob or handle adapted to be manipulated by the user's fingers to pivot the lever about pin 26 to swing inner end 24 of the lever in a plane of the bore axis. Pawl 14 is secured to the inner end of the lever, such as by threaded engagement therewith and is, thus, moved by the lever alternatively toward or away from side wall 15 of the tube end received in bore 21.

Pawl 14 comprises an arcuate element preferably formed of a hard material such as steel. The radially inner, tube confronting portion of the pawl includes a bevel surface 27 which guides the tube end during movement thereof into bore 21 and permits the tube end to swing the pawl toward the released position. Thus, the tube end may be moved freely into the bore without binding against the pawl. The radially inner portion of the pawl further includes a cylindrical surface 28 having a curvature diameter comparable to the outside diameter of tube end 10. The longitudinally inner portion is bevelled at 28a to extend at an acute angle longitudinally inwardly. In the illustrated embodiment, the bevel 28a is planar and is arranged at an angle of approximately 45 degrees to the axis of cylindrical portion 27. The longitudinally inner edge 29 of the pawl defines a tube engaging edge which tends to dig into side wall 15 of the tube when the lever 13 is pivoted to move pawl 14 toward flange 22. As the lever is over center longitudinally inwardly, this engagement of the pawl with tube end 10 locks the tube from inadvertent withdrawal axially outwardly from bore 21. However, to release the tube, when desired, knob 25 simply manipulated to swing pawl 14 longitudinally inwardly (away from flange 22) and, thus, move the pawl slightly radially outwardly and away from contact with side wall surface 15.

As alluded to briefly above, spring 16 biases the retaining means R so that pawl edge 29 is normally urged into contact with tube side wall surface 15. Thus, it is not necessary to manipulate knob 25 to cause edge 29 to have its initial engagement with the tube, but all that need be done to effect the connection is to insert the tube end 10 within the bore to beyond seal ring 18. Any tendency of the tube end to move axially outwardly from the bore causes edge 29 to engage more forcibly the side wall surface and, thus, automatically effects a positive locking of the tube end to the connector. As best seen in FIGS. 2 and 3, spring 16 comprises a large diameter coil spring having an outside diameter comparable to the diameter of bore midportion 21b in which the spring is disposed. One end 16a of the spring engages pawl 14 to bias the pawl as described above. The opposite end 16b of the spring engages an annular flange 30 on sleeve 19 to bias the sleeve longitudinally inwardly (away from flange 22) and urge flange 30 toward an inner end 31 of an exteriorly threaded portion 32 of the member 17 which portion is threadedly received in end portion 21c of the bore. Extending completely through member 17 is a passage 33 having a threaded outer end 33a, a reduced diameter cylindrical portion 33b, and enlarged diameter cylindrical portion 33c, and a more greatly enlarged diameter inner cylindrical portion 33d. The diameter of passage portion 33c is preferably slightly larger than the external diameter of tube end 10 so that the tube end may be freely inserted thereinto to abut, when fully inserted, a radial shoulder 34 between passage portions 33c and 33b.

Seal 18 comprises a resilient, annular member, herein a rubber O-ring, and is received within passage portion 33d to abut a shoulder 35 extending radially intermediate passage portions 33d and 33c. Sleeve 19 is provided with a tubular inner portion 36 which extends through passage portion 33d to engage the O-ring. Spring 16 biases the sleeve so that the O-ring is constricted between sleeve portion 36 and shoulder 35 and, as a result of the longitudinal constriction, is expanded radially inwardly into sealing and gripping engagement with side wall 15 of the tube end. The longitudinal inward movement of sleeve 19 is limited by the abutment of flange 30 thereof with end 31 of the valve body so that an automatic limitation on the amount of construction of O-ring 18 is effected. As best seen in FIG. 3, the disposition of O-ring 18 at shoulder 35 permits a proper seal to be effected with the tube side wall while allowing the tube end to extend to any point between shoulders 34 and 35. As it is not necessary to insert the tube fully into passage portion 33c to abut shoulder 34, improved facility of connection is obtained as where the tube end is immovable.

The disclosed arrangement of the connector elements provides improved desired retention of the tube end in the connector. In addition to providing two separate means for holding the tube end, namely retaining means R and O-ring 18, the connector is arranged in a new and improved manner to utilize positive pressure within the tube end for increasing the holding action. Thus, as best seen in FIG. 3, positive pressure acts to the left against O-ring 18 to force the O-ring against the sleeve. In addition to causing the O-ring to expand radially and sealingly grip the tube end and the member 17, this leftward urging also causes sleeve flange 30 to urge spring 16 more forcibly against lever 13 of the retaining means R. Thus, pawl 14 is forced more tightly against the tube surface, locking the tube end more positively to the connector.

Valve 20 may comprise any suitable valve means for controlling the fluid flow through passage 33. In the illustrated embodiment, valve 20 comprises an air valve as conventionally used in automobile tires and is arranged to permit the ready introduction of fluid under pressure through passage 33 into the interior of the tube end. Upon release of the means (not shown) for delivering the fluid to the connector, the valve automatically sealingly closes passage 33. To remove the connector from tube end 10, when desired, valve 20 may first be operated to release the fluid pressure within the tube end or, alternatively, if the pressure therein is relatively low, lever 13 may be manipulated to release the hold of pawl 14 on the tube end and the tube is withdrawn directly while allowing the fluid pressure to dissipate itself through bore 21 during the withdrawing operation.

The improved facility with which the connector 11 may be connected to tube end 10 makes connector 11 desirable for use even where it is not intended that it be removed from the tube end. The seal effected by sealing ring 18 and the retaining action of pawl 14 and lever 13 provides a positive sealing connection of the connector to the tube end which will remain as long as desired.

While I have shown and described certain embodiments of my invention, it is to be understood that it is capable of many modifications. Changes, therefore, in the construction and arrangement may be made without departing from the spirit and scope of the invention as defined in the appended claims.

I claim:

1. A tube connector comprising: means defining a bore for insertion thereinto of an end of a tube, said bore having a longitudinally inner portion arranged to receive freely the tube end, a mid-portion and a longitudinally outer portion each having a diameter larger than the inner portion, and a radial shoulder between the inner portion and the mid-portion; a retaining means movably associated with the body and having tube engaging means in said bore outer portion; a seal ring in the bore mid-portion and having an unstressed inner diameter comparable to the outer diameter of the tube end to permit free insertion therethrough of the end of the tube; biasing means in said mid-portion and outer portion of the bore extending between said retaining means and said seal ring for resiliently urging said retaining means to a position wherein the tube engaging means has wedging engagement with the tube end, said biasing means including an annular member urged against said seal ring to retain the seal ring against said bore shoulder while allowing fluid pressure acting between said seal ring and said shoulder to press the seal ring against said annular member and deform the seal ring radially into sealing engagement with the tube side wall and urge the annular member longitudinally outwardly to increase the resilient force produced by the biasing means for urging the retaining means to the tube wedging position.

2. A tube connector comprising: means defining a bore for insertion thereinto of an end of a tube, said bore having a longitudinally inner portion arranged to receive freely the tube end, a mid-portion and a longitudinally outer portion each having a diameter larger than the inner portion, a first radial shoulder between said mid-portion and said outer portion, and a second radial shoulder between the inner portion and the mid-portion; a retaining means movably associated with the body and having tube engaging means in said bore outer portion; a seal ring in the bore mid-portion and having an unstressed inner diameter comparable to the outer diameter of the end of the tube; biasing means in said mid-portion and outer portion of the bore extending between said retaining means and said seal ring for resiliently urging said retaining means to a position wherein the tube engaging means has wedging engagement with the tube end, said biasing means including an annular member urged against said seal ring to retain the seal ring against said bore second shoulder while allowing fluid pressure acting between said seal ring and said shoulder to press the seal ring against said annular member and deform the seal ring radially into sealing engagement with the tube side wall and urge the annular member longitudinally outwardly to increase the resilient force produced by the biasing means for urging the retaining means to the tube wedging position, the longitudinally inward movement of the annular member being limited by abutment thereof with said bore first shoulder whereby said annular member is prevented from excessively deforming the seal ring.

3. A tube connector comprising: a body having a bore for insertion thereinto of an end of a tube; a lever extending transversely through said body and having a pawl on a radially inner end thereof in said bore for wedging engagement with the tube end; means biasing the pawl into a radially inner, wedging position relative to the tube end while permitting said lever to be moved in opposition thereto to dispose the pawl in a radially outer, released position; a member secured to the body and having a passage defining a continuation of said bore; annular sealing means coaxially in the passage for sealing the side wall of the tube end to said member; and a sleeve in said bore defining one longitudinal abutment for the sealing means, said biasing means having a portion engaging the sleeve to retain the sleeve in abutment with the sealing means and permitting said sealing means to be deformed by a fluid pressure differential thereacross to grip sealingly the side wall of the tube end.

References Cited in the file of this patent
UNITED STATES PATENTS

| | | |
|---|---|---|
| 1,098,265 | James | May 26, 1914 |
| 2,749,154 | Smith | June 5, 1956 |
| 2,759,944 | Krapp | Aug. 7, 1956 |
| 2,819,733 | Maisch | Jan. 4, 1958 |